(12) United States Patent
Chao et al.

(10) Patent No.: US 9,145,334 B2
(45) Date of Patent: Sep. 29, 2015

(54) ISOCYANATE-FREE INSULATED GLASS SEALANT AND INSULATED GLASS UNITS USING THE SAME

(75) Inventors: Herbert Shin-I Chao, Paoli, PA (US); Nan Tian, Wilmington, DE (US)

(73) Assignee: Fina Technology, Inc., Houston, TX (US)

( * ) Notice: Subject to any disclaimer, the term of this patent is extended or adjusted under 35 U.S.C. 154(b) by 954 days.

(21) Appl. No.: 13/240,372

(22) Filed: Sep. 22, 2011

(65) Prior Publication Data

US 2013/0078397 A1 Mar. 28, 2013

(51) Int. Cl.
| | | |
|---|---|---|
| *E06B 3/66* | (2006.01) | |
| *C03C 27/10* | (2006.01) | |
| *C08K 3/40* | (2006.01) | |
| *C08L 9/00* | (2006.01) | |
| *E06B 3/667* | (2006.01) | |
| *E06B 3/673* | (2006.01) | |
| *C08K 5/29* | (2006.01) | |
| *C09K 3/10* | (2006.01) | |
| *C08G 81/02* | (2006.01) | |
| *C08L 79/00* | (2006.01) | |

(52) U.S. Cl.
CPC ............. *C03C 27/10* (2013.01); *C08G 81/024* (2013.01); *C08K 3/40* (2013.01); *C08K 5/29* (2013.01); *C08L 9/00* (2013.01); *C09K 3/10* (2013.01); *E06B 3/66* (2013.01); *E06B 3/667* (2013.01); *E06B 3/673* (2013.01); *C08L 79/00* (2013.01); *C09K 2003/1053* (2013.01); *Y10T 428/31623* (2015.04)

(58) Field of Classification Search
CPC ...... C08K 5/29; C08G 18/797; C08G 18/025; C08G 81/024
USPC ....................................................... 525/123
See application file for complete search history.

(56) References Cited

U.S. PATENT DOCUMENTS

| | | | |
|---|---|---|---|
| 3,639,353 A | | 2/1972 | Brown |
| 3,897,514 A | * | 7/1975 | Allabashi .................. 528/92 |
| 4,153,594 A | | 5/1979 | Wilson, Jr. |
| 4,156,700 A | * | 5/1979 | Tremblay et al. ............. 525/113 |
| 4,242,415 A | * | 12/1980 | Feltzin et al. .................. 428/412 |
| 5,574,083 A | | 11/1996 | Brown et al. |
| 5,587,433 A | * | 12/1996 | Boeckeler .................. 525/333.2 |
| 5,856,014 A | * | 1/1999 | Imashiro et al. ........... 428/425.8 |
| 6,301,858 B1 | | 10/2001 | Crandell |
| 6,457,294 B1 | | 10/2002 | Virnelson |
| 6,796,102 B2 | | 9/2004 | Virnelson |
| 7,901,695 B2 | | 3/2011 | Chao |
| 2004/0180044 A1 | * | 9/2004 | Chao et al. .................. 424/130.1 |
| 2010/0105797 A1 | | 4/2010 | Hiraiwa et al. |
| 2011/0039108 A1 | | 2/2011 | Goeb |

FOREIGN PATENT DOCUMENTS

| | | |
|---|---|---|
| JP | 0513142 | 2/1993 |
| JP | 2008-041800 A | 2/2008 |
| WO | WO 2011/078922 A1 | 6/2011 |

OTHER PUBLICATIONS

Cray Valley Product Bulletin. Evidentiary Reference.*
Tillet, G., et al., "Chemical Reactions of Polymer Crosslinking and Post-Crosslinking at Room and Medium Temperature," Progress in Polymer Science 36 (2011), pp. 191-217.
International Search Report for International Application No. PCT/US2012/054984 dated Nov. 11, 2013.

* cited by examiner

*Primary Examiner* — Mike M Dollinger
(74) *Attorney, Agent, or Firm* — RatnerPrestia

(57) ABSTRACT

An insulated glass sealant includes an elastomeric matrix that is the reaction product of a carboxyl-terminated polymer and a polycarbodiimide. A method of sealing an insulated glass unit includes applying the insulated glass sealant to one or more glass sheets, a spacer to be disposed between the glass sheets, or both; and contacting the one or more glass sheets with the spacer to define an annular space between the glass sheets and to produce the insulated glass unit. The sealants maintain the excellent attributes of traditional polyurethane sealants, such as low water swell, low moisture vapor transmission, good adhesion to the window frame, low migration of the insulating gas, and good workability, but without the use of polyisocyanates in the curing process. Methods for making the sealant and for sealing insulated glass panels, such as glass windows, with these rugged sealants, and the resulting articles, are also provided.

28 Claims, No Drawings

ISOCYANATE-FREE INSULATED GLASS SEALANT AND INSULATED GLASS UNITS USING THE SAME

FIELD OF THE INVENTION

This invention relates generally to compositions which may be employed as insulated glass sealants and methods of manufacturing and utilizing such sealants in the construction of insulated glass units. Specifically, the invention relates to rugged sealants based on the reaction products of polycarbodiimides and carboxyl-terminated polymers such as carboxyl-terminated polybutadienes. The sealants of the present invention maintain the excellent attributes of traditional polyurethane sealants, such as low water swell, low moisture vapor transmission, good adhesion to the window frame, low migration of the insulating gas, and good workability, but without the use of polyisocyanates in the curing process. Methods for sealing insulated glass panels, such as glass windows, with these rugged sealants, and the resulting articles, are also disclosed herein.

BACKGROUND OF THE INVENTION

Insulated glass units (IGUs) generally comprise a pair of glass sheets, maintained in a spaced apart relationship to each other by a spacer assembly, and a sealing assembly which extends around the periphery of the inner facing surfaces of the glass sheets to define a sealed and insulating air space between the glass sheets. Typically, the spacer assembly is a hollow form which extends around the periphery of the inside facing surfaces of the glass sheets and which is filed with a water-absorbent material, such as a molecular sieve or another dehydration element, to keep the enclosed air space dry. The inner surfaces of the glass sheets are attached to the outer surface of the spacer assembly by means of a sealant or adhesive. Generally, the sealant or adhesive is also used to seal the edges of the insulated glass unit so as to establish a barrier which prevents moisture from penetrating into the interior annular space of the unit.

The sealant must have a combination of properties for satisfactory use. For example, the sealant must have a very low moisture vapor transmission (MVT) rate so that moisture is prevented from entering the dry annular space between the panes of glass. Moisture in such space tends to condense on the interior faces of the panes, creating visibility and aesthetic problems. If the sealant does not have a satisfactory MVT rate, the longevity of the insulated unit may be severely reduced. The sealant should have good elongation and flexibility so that it "yields" during contraction and expansion of the insulated glass structure, for example, to relieve stress on the glass caused by changes in temperature. The sealant desirably also forms an excellent bond with the glass which is not degraded over long periods of use when exposed to sunlight, moisture, and large temperature changes. Tensile adhesion strength is an important indicator of bond strength.

Two of the major types of sealants currently used in the insulated glass industry are: (A) thermoplastic one-part hot melt butyl type sealants, and (B) the chemically-curing thermoset sealant products generally from the generic families of polysulfide, polyurethane, and silicone. Hot melt butyl insulated glass sealants have been used with moderate success for a number of years in the insulated glass industry. However, there are significant shortcomings with this technology that have limited the application of hot melt butyl insulated glass sealants. Primarily, the hot melt butyl is a thermoplastic material, and not a thermoset material. Thermoplastic sealants are well known to soften when exposed to heat. Therefore, the insulated glass units sold in the marketplace which employ thermoplastic sealants are known to flow or deform, when placed under load, to relieve such stresses. This characteristic is exaggerated at high temperatures, which can occur in insulated glass units, especially those utilizing solar control glass. As a result, insulated glass units made with hot melt butyl sealants have difficulty passing stress and temperature tests common in industry, and are often limited for use in relatively small, light insulated glass units. Additionally, extreme care must be taken to support the insulated glass unit during handling, shipping and installation, resulting in additional costs. Furthermore, the hot melt sealants previously employed must be applied to the insulated glass units at temperatures exceeding 300° F. These high temperature requirements often present increased manufacturing costs, for example due to higher energy consumption and the need for specialized high-temperature equipment, as well as operational and safety challenges. Attempts to utilize lower temperature hot melts have been known to cause flow problems with the sealant.

The thermoset products which are currently used are generally two-component sealants which are mixed at the point of application at room temperature. The sealants then cure slowly by reaction with a supplied catalyst or through reaction with moisture. This slow cure requires that the insulated glass units be held in inventory from several hours to days waiting for the sealant to harden. Several single-component sealants are also available in the marketplace, such as those which include a partially cross-linked hot melt butyl rubber sealant. These single-component sealants, however, generally require treatment at elevated temperatures from about 325° F. to about 425° F. to crosslink the sealant. Other sealants employed in the art utilize urethane-curing chemistry, which is unsuitable for insulated glass industry because the carbon dioxide ($CO_2$) generated in the process as bubbles can get trapped at the interface of the sealant and the glass which detrimentally affect the visibility and aesthetics of the insulated glass unit.

More recently, sealants based on polyurethane chemistry have been used for insulated glass units. These polyurethane-based sealants employ polyols, such as hydroxyl-terminated polybutadiene, to react with isocyanate to form a sealant. However, such sealants have environmental and safety concerns due to the utilization of isocyanates. As known to one having ordinary skill in the art, isocyanates are a family of highly reactive, low molecular weight chemicals. Isocyanates are powerful irritants to the mucous membranes of the eyes and gastrointestinal and respiratory tracts. Direct skin contact can also cause marked inflammation. Prolonged exposure can also sensitize workers, making them subject to severe asthma attacks or death if they are exposed again. Accordingly, compositions which have the beneficial properties of known insulated glass sealants, without the harmful safety concerns or detrimental by-products are highly desirable.

SUMMARY OF THE INVENTION

It has now been found that the reaction products of reacting polycarbodiimides with carboxyl-terminated polymers, such as carboxyl-terminated polybutadienes, provide rugged sealants for use in insulated glass applications. The sealants of the present invention maintain the excellent attributes of traditional polyurethane sealants, such as those based on the reactions of hydroxyl-terminated polybutadiene and isocyanates, including low water swell, low moisture vapor transmission, good adhesion to the window frame, low migration of the insulating gas, and good workability, but without the use of isocyanates in the curing process. Because the present sealant employs compatible compositions which solidify at different rates and through different mechanisms, the sealant can be applied at a lower temperature than traditional hot melts, and also provides sufficient handling strength to the unit faster than traditional chemical-cure products, thereby combining the best properties of both the hot melt and chemically-curing technologies into a successful sealant for the insulated glass industry. The sealant of the present invention is designed to be applied at temperatures in the range of 70°-300° F., in the form of a liquid or paste which turns to a solid upon curing. These and other advantages of the present invention will be readily apparent from the description, the discussion, and examples which follow.

It has further been found that the sealants may be applied to the panels of insulated glass units, such as at the edges of the panels, to adhere the components of the units together and, thereby, sealing the unit from subsequent moisture penetration. Most specifically, the present invention relates to a one-component edge sealant for insulated glass units which may be applied as a liquid or paste at an elevated temperature. The sealant is capable of then reversibly and rapidly solidifying upon cooling and, thereafter, irreversibly solidifying upon exposure to ambient atmospheric conditions. Accordingly, the present invention relates to the sealants, methods for sealing insulated glass panels such as glass windows with the sealants, and the resulting insulated glass unit articles.

In a first embodiment of the present invention, an insulated glass sealant comprises an elastomeric matrix that is the reaction product of a carboxyl-terminated polymer and a polycarbodiimide. The elastomeric matrix is not a gel but rather is harder and more elastomeric (rubbery) than a gel. For example, the relative ratios of the reactants and the reaction/processing conditions may be selected to provide an elastomeric matrix having a Shore 00 hardness at 25° C. of at least about 30, at least about 35, at least about 40, at least about 45, or at least about 50. The sealant may further comprise one or more additives selected from the group consisting of inorganic fillers, plasticizers, chain extenders, and mixtures thereof. In at least one embodiment, the carboxyl-terminated polymer is hydrophobic. Suitable carboxyl-terminated polymers may be those which have a glass transition temperature (Tg) of less than about 32° F. (0° C.). The polymeric portion of the carboxyl-terminated polymer may, for example, be a homopolymer or copolymer of one or more diene monomers such as butadiene or isoprene or a copolymer of one or more diene monomers with one or more non-diene monomers such as styrene and/or acrylonitrile. Suitable polycarbodiimides include, but are not limited to, aromatic, cycloaliphatic, aliphatic, and heterocyclic carbodiimides, and mixtures of two of more thereof. For example, suitable polycarbodiimides may have an average functionality equal to, or greater than, 2 (meaning that the polycarbodiimide contains at least two carbodiimide functional groups per molecule).

In another embodiment, the present invention relates to a method of sealing an insulated glass unit. The method includes applying the insulated glass sealant to one or more glass sheets, a spacer to be disposed between the glass sheets, or both; and contacting the one or more glass sheets with the spacer to define an annular space between the glass sheets and to produce the insulated glass unit. The sealant may be applied in a number of different methods using various equipment, as would be readily appreciated by an ordinarily skilled artisan. For example, the sealant may be applied as a bead to the one or more glass sheets, the spacer, or both. The method may further include the step of, prior to or concurrent with the contacting step, introducing an insulating gas into the annular space created between the first and second glass sheets. Exemplary insulating gases include argon or krypton.

In a further embodiment, the present invention relates to an insulated glass unit. The unit includes a first glass sheet having an inner surface and an outer surface; a second glass sheet having an inner surface and an outer surface, wherein the first and second glass sheets are positioned such that said inner surfaces of the glass sheets are facing one another; a spacer located between the first and second glass sheets, the spacer having a first side and a second side, with the first side of the spacer located adjacent the inner surface of the first glass sheet and the second side of the spacer located adjacent the inner surface of the second glass sheet; and an insulated glass sealant connecting the first and second glass sheets to the spacer. The first and second glass sheets and the spacer may be configured to provide an annular space between the glass sheets. The insulated glass unit may further include an insulating gas within the annular space.

As will be described in more detail below, the elastomeric matrix of the insulated glass sealants may be formed directly from the reaction of the carboxyl-terminated polymer and the polycarbodiimide. Alternatively, the elastomeric matrix may be formed by first reacting a hydroxyl-terminated polymer with an anhydride and, optionally, a chain extender, to produce the carboxyl-terminated polymer; and then reacting the carboxyl-terminated polymer with the polycarbodiimide. Similarly, the elastomeric matrix may be formed by reacting a hydroxyl-terminated polymer with an anhydride and, optionally, a chain extender, in situ with the polycarbodiimide. Any suitable anhydride, such as 4-methylhexahydrophthalic anhydride (HHMPA), and chain extender, such as N,N-diisopropanol aniline (DIPA) and 2-ethyl-1,3-hexanediol (EHD), may be employed. As would be appreciated by one having ordinary skill in the art, a number of other reactants may be utilized within contemplation of this invention to produce carboxyl-terminated polymers in advance of, or concurrently in situ with, the reaction with the polycarbodiimide.

DETAILED DESCRIPTION OF THE INVENTION

The present invention is directed to compositions which may be employed as insulated glass sealants and methods of manufacturing and utilizing such sealants in the construction of insulated glass units. The purpose of the sealant is to provide structural integrity to the unit while sealing out moisture and preventing the exchange of gases. The edge sealant also resists environmental attack from water, UV, and temperature extremes.

Specifically, the invention relates to rugged sealants based on the reaction products of polycarbodiimides and carboxyl-terminated polymers, such as carboxyl-terminated polybutadiene. The sealants of the present invention maintain the excellent attributes of traditional polyurethane sealants, such as low water swell, low moisture vapor transmission, good adhesion to the window frame, low migration of the insulating gas, and good workability, but without the use of polyisocyanates in the curing process. The invention further relates to methods for sealing insulated glass panels with these rugged sealants, and the resulting insulated glass articles.

Insulated glass sealants currently available in the marketplace employ polyols, such as hydroxyl-terminated polybutadienes, which react with polyisocyanates to form a polyurethane sealant. Embodiments of the present invention, however, react carboxyl-terminated polymers, such as carboxyl-terminated polybutadienes, with polycarbodiimide instead of polyisocyanate. The carboxyl-terminated polymers are employed in the present invention as the continuous phase in the elastomeric sealant matrix because the hydrophobicity of the polymeric portion of the carboxyl-terminated polymer (e.g., polybutadiene) is advantageous to the final sealant. The use of polycarbodiimide instead of polyisocyanate as a crosslinking agent, however, provides certain environmental, regulatory, and safety benefits. Additionally, the polybutadienes employed by the present invention are carboxyl-terminated instead of the hydroxyl-terminated polybutadienes more commonly used in insulated glass sealant technologies. "Carboxyl-terminated" means that a carboxylic acid group (—$CO_2H$) is present somewhere along the chain of the polymer, for example pendent to the backbone of the polymer chain or at the end of the polymer chain. In one embodiment, each end of the polymer bears a carboxylic acid group. In another embodiment, carboxylic acid groups are present only at the ends of the polymer chain.

The elastomer matrix of the present invention is formed by a process comprising reacting polycarbodiimides with carboxyl-terminated polymers. The carboxyl-terminated polymer preferably comprises a major component. The major component typically makes up at least 90% by weight of the carboxyl-terminated polymer and is selected from the group consisting of polymeric carboxyl-terminated substances, such as carboxyl-terminated polybutadienes, polyisoprenes, copolymers of butadiene with acrylonitrile, copolymers of butadiene with styrene, copolymers of isoprene with acrylonitrile, copolymers of isoprene with styrene, and mixtures of two or more of the above. The optional minor component is selected from the group consisting of monomeric or dimeric carboxyl-terminated compounds, such as adipic acid, azelaic acid, isophthalic acid and dimer fatty acid.

The sealants of the present invention maintain the excellent attributes of traditional polyurethane sealants, including low water swell, low moisture vapor transmission, good adhesion to the window frame, low migration of the insulating gas, and good workability, but without the use of isocyanates in the curing process. Because the present sealant employs compatible compositions which solidify at different rates and through different mechanisms, the present invention can be applied at a lower temperature than traditional hot melts, and also provides sufficient handling strength to the unit faster than traditional chemical-cure products, thereby combining the best properties of both the hot melt and chemically-curing technologies into a successful sealant for the insulated glass industry. The sealant of the present invention is designed to be applied at temperatures in the range of 70°-300° F., in the form of a liquid or paste which turns to a solid upon curing. The sealant of the present invention then cures chemically to provide a permanent elastomeric, temperature-resistant sealant which provides the structural integrity for the insulated glass unit.

As would be readily appreciated by one having ordinary skill in the art, the strength properties of the insulated glass sealants in the fluid phase, i.e., liquid or paste, can be controlled by the type and quantity of the carboxyl-terminated polymer and, optionally, any additives. Ultimate strength of the edge sealant is controlled by the type and cross-linked density of the polycarbodiimide. Suitable carboxyl-terminated polymers generally have a glass transition temperature (Tg) of less than about 32° F. (0° C.). Suitable polymers useful as the polymeric portion of such carboxyl-terminated polymers including homopolymers and copolymers of dienes such as butadiene and isoprene as well as copolymers of one or more diene monomers with one or more non-diene monomers such as styrene and acrylonitrile. Furthermore, suitable hydrophobic carboxyl-terminated polymers include carboxyl-terminated polybutadienes, carboxyl-terminated polyisoprenes, carboxyl-terminated copolymers of butadiene with acrylonitrile, carboxyl-terminated copolymers of butadiene with styrene, carboxyl-terminated copolymers of isoprene with acrylonitrile, carboxyl-terminated copolymers of isoprene with styrene, and mixtures thereof. The carboxyl-terminated polymers preferably have a number average molecular weight in the range of 500 to 30,000. The number average molecular weight of the carboxyl-terminated polymers may be more specifically in the range of 750 to 25,000, and more preferably in the range of 1,000 to 20,000. The carboxyl-terminated polymers may, for example, be linear or branched. A branched carboxyl-terminated polymer may contain 3, 4, 5, 6 or even a greater number of ends (branches). The polymeric segments of these substances, if comprised of two or more different monomers, may be random, block, or tapered copolymers. Additionally, the polymers may contain any number of carboxyl groups per molecule, such as at least 2 or more carboxyl groups per molecule. The carboxyl (—$CO_2H$) groups may appear anywhere in the polymer, for example, pendent to the backbone of the polymer chain and/or, in a preferred embodiment, at each end of the polymer chain. In one aspect of the invention, the polymer bears carboxylic acid groups only at the terminal positions of the polymer chain. In one embodiment, the polymeric portion of the carboxyl-terminated polymer is saturated or essentially saturated. For example, if such polymeric portion is derived by polymerization of a diene monomer, the olefinic sites present may be hydrogenated. Mixtures of different carboxyl-terminated polymers may be employed if so desired.

Carboxyl-terminated polymers suitable for use in the present invention are available from commercial sources, such as Cray Valley USA, LLC.

A preferred carboxyl-terminated polybutadiene may be selected from those which are hydroxyl-terminated polybutadienes reacted with a stoichiometric amount of an anhydride such as 4-methylhexahydrophthalic anhydride (HHMPA). Other suitable anhydrides include, for example, aliphatic as well as aromatic anhydrides such as, for example, phthalic anhydride, succinic anhydride, maleic anhydride, trimellitic anhydride, hexahydrophthalic anhydride, chlorendic anhydride, tetrachlorophthalic anhydride, methyltetrahydrophthalic anhydride, itaconic anhydride, pyromellitic dianhydride, benzophenonetetracarboxylic dianhydride, or cyclopentanetetracarboxylic dianhydride. Accordingly, the polymers may be utilized in the reaction process as carboxyl-terminated polymers directly or employed as hydroxyl-terminated polymers which are reacted with an anhydride to produce the carboxyl-terminated polymer. As will be shown below, the reaction between the hydroxyl-terminated polymers and the anhydride may take place prior to the addition of the polycarbodiimide, or may occur simultaneously, such as in situ, during the reaction with the polycarbodiimide. Additionally, a chain extender, such as 2-ethyl-1,3-hexanediol, may be utilized during one or more of these reaction processes. The carboxyl-terminated polymer may also be prepared by any other method known in the art such as, for example, esterification of the hydroxy groups of a hydroxyl-terminated polymer with a diacid.

The embodiments of the present invention may utilize a myriad of suitable polycarbodiimides including, for example, aromatic, cycloaliphatic, aliphatic, and heterocyclic carbodiimides, and mixtures of two or more thereof. The polycarbodiimides used are preferably produced by subjecting polyfunctional, preferably bifunctional, aliphatic, or, preferably, aromatic isocyanates to carbodiimide formation. Monofunctional or trifunctional and higher-functional isocyanates may be used as chain terminators or branching agents for the polycarbodiimides, although they should be employed in quantities of less than about 20% by weight, and preferably in quantities of less than about 10% by weight, of the total quantity of isocyanate. The polycarbodiimides preferably have an average functionality equal to, or greater than, 2. The sealants of the present invention include an elastomeric matrix having a carbodiimide:carboxylic acid equivalent ratio. This equivalent ratio is provided by the polycarbodiimide and by the carboxyl-terminated polymer, respectively. The preferable equivalent ratio of polycarbodiimide to carboxyl-terminated polymer is from about 0.25:1 to about 2:1. The equivalent ratio may be more specifically in the range of 0.5:1 to about 1.5:1, and more preferably in the range of 0.7:1 to about 1.4:1.

Suitable isocyanates include alkyl isocyanates, such as methyl, allyl, butyl, stearyl isocyanate; alkyl diisocyanates such as ethylene diisocyanate, tetramethylene diisocyanate, hexamethylene diisocyanate, isophorone diisocyanate; aromatic monofunctional and bifunctional isocyanates, such as phenyl isocyanate, phenylene diisocyanates, the isomeric toluene diisocyanates, diphenyl methane diisocyanates, dimethyl diphenyl methane diisocyanates, and commercial-grade biphenyl methane diisocyanate mixtures which may optionally contain polynuclear diisocyanates or trifunctional isocyanates as well. Preferred isocyanates are hexamethylene diisocyanate, isophorone diisocyanate, the toluene diisocyanates and diphenyl methane diisocyanates. The isomers of toluene diisocyanate are preferred.

Suitable polycarbodiimides have at least 2 carbodiimide groups, preferably at least 3 carbodiimide groups in one molecule. The term "poly" in "polycarbodiimide" means that the polycarbodiimide contains a plurality of carbodiimide groups (multifunctional carbodiimide) and does not necessarily mean the polycarbodiimide is polymeric in character. The molecular weight of the polycarbodiimide is not limited, but preferably is within the range of 250 to 10,000. All reference to molecular weights herein is to number average molecular weights. The polycarbodiimide is preferably prepared by polycondensation of an organic polyisocyanate in the presence of a carbodiimide promoting agent. The organic polyisocyanate may be, for example, an aromatic polyisocyanate, such as 2,4- or 2,6-toluene diisocyanate, naphthalene 1,5-diisocyanate and diphenylmethane 4,4'-diisocyanate; and an aliphatic or alicyclic polyisocyanate, such as hexamethylene diisocyanate, hydrogenated diphenylmethane 4,4'-diisocyanate, isophorone diisocyanate, and hydrogenated 2,4- or 2,6-toluene diisocyanate. A carbodiimide promoting agent may be employed including: 1-phenyl-phosphorene-1-oxide, 1-phenyl-3-methyl-phosphorene-1-oxide, 1-ethyl-phosphorene-1-oxide or any other suitable promoting agent that is known to the art.

In the preparation of the polycarbodiimide, molecular weight can be controlled by terminating the polycondensation with an organic monoisocyanate, for example as disclosed in J. Appl. Polym. Sci. by L. N. Alberine, Vol 21, p. 1999 (1977). Examples of the organic monoisocyanates are phenyl isocyanate, toluene isocyanate, cyclohexyl isocyanate, butyl isocyanate and the like. A blocking technique in which a terminal isocyanate group is blocked with an active-hydrogen containing compound (a blocking agent) can also control the molecular weight of the polycarbodiimide. The blocking agent is described in detail in, for example, Progress in Organic Coatings, Vol. 3, p. 73 (1975). Typical examples of the blocking agents are alcohols, phenols, lactams, N-hydroxyimide, oximes, imidazoles, triazoles, active methylene compounds (e.g. acetyl acetone and diethyl malonate), aromatic secondary amines, acidic sodium sulfite, and the like.

The elastomeric matrix optionally may comprise components that do not participate in the crosslinking reaction between polyacid and carbodiimide. Among such "nonreactive" components, or additives, are comprised: fillers, plasticizers, stabilizers, pigments, fungicides, weatherability improvers, catalysts, and the like, as are known in the art. The strength properties of the insulated glass sealants in the fluid phase may also be affected by the type and quantity of additives. For example, a range of fillers may be selected by one of skill in the art and added in an amount sufficient to impart the appropriate strength to the liquid phase, as well as to impart desirable application properties to the sealant. One preferred filler is calcium carbonate. Other fillers can be used, as is known in the art. The sealant of the present invention should be easy to handle and apply to the insulated glass units. Any number of methods and equipment may be used to apply or provide the sealant to the insulated glass units, such as by spray, beading, or deposition.

Additionally, the insulated glass sealants may include one or more chain extenders. Conventionally, N,N-diisopropanol aniline (DIPA) and 2-ethyl-1,3-hexanediol (EHD) are recommended for their compatibility and physical property enhancement of the elastomeric matrix. As would be appreciated by one having ordinary skill in the art, elastomeric matrices based on polybutadiene polyols are known for excellent hydrophobicity, hydrolytic and chemical resistance, electrical insulation properties, and low-temperature flexibility. Incorporating chain extenders, such as diols of low molecular weight, in the gum stock formulas enhances the elastomeric properties of the resulting matrices, because the small diols react in situ and form hard domains to serve as the physical crosslink for the polyurethane systems. Traditionally, 1,4-butanediol is one of the most important chain extenders used in commercial polyurethane elastomers based on polyether or polyester polyols. Certain chain extenders, such as EHD and DIPA (for example, Voranol® 220-530) have been found to work effectively for elastomeric matrices derived from either Poly bd® resins, which are radically polymerized products having about 2.5 hydroxyl functionalities, or Krasol® LBH and LBH-P polybutadiene diols resins, which are anionically polymerized products with a very narrow molecular-weight distribution, each containing no species with a functionality higher than 2.0. Poly bd® and Krasol® resins are commercially available from Cray Valley USA, LLC of Exton, Pa. Other curing additives may be utilized, including hexahydro-4-methylphthalic anhydride (HHMPA), plasticizers, and polycarbodiimide crosslinkers. It may also be desirable, in some instances, to add additional fillers, pigments, rheological agents and like.

The sealant of the present invention may be prepared in the following manner. For example, the carboxyl-terminated polymer(s) may first be disposed in a mixing vessel. The mixing vessel may be capable of carrying out mixing under a vacuum and may further include a mixer that comprises a variable speed, multi-shaft unit, having a low speed sweep blade, a high speed disperser, and a low speed auger. The filler, if utilized, may then be added to the polymer(s). Thereafter, the polycarbodiimide or mixtures thereof, may be added to the mixture subsequent to turning on the vacuum. At the point the polycarbodiimide is added, the mixing is conducted under vacuum so as to eliminate any exposure of the mixture to atmospheric conditions, and also to remove residual water from the raw materials, thereby improving the stability of the sealant. Small volume additives such as pigments, weatherability improvers and the like can be added before the introduction of the polycarbodiimide, or added thereafter. The elastomeric matrix is maintained under essentially dry conditions until such time as it is ready to be applied to the insulated glass unit. In other preferred embodiments, the mixing may be carried out under a blanket of dry, inert gas.

The insulated glass sealant of the present invention is applied to the insulated glass unit at temperatures of about 70°-300° F. in the form of a liquid or a paste. Thereafter the sealant cured gradually into a crosslinked solid. The sealant of the present invention is applied to the unit as a single material, therefore eliminating the need to combine several components together at the point of application.

The insulated glass sealants of the present invention may be utilized to produce an insulated glass unit. As would be appreciated by one having ordinary skill in the art, insulated glass units are generally configured to have a first glass sheet spaced apart from a second glass sheet by a spacer frame. The spacer frame generally has a base and two spaced apart legs joined to the base to provide a substantially U-shape. The space created by the spacer frame between the first and second glass sheets defines an interior annular space of the insulated glass unit. The spacer frame, which may be a flexible spacer frame, has a first side and a second side, with the first side located adjacent an inner-surface of the first glass sheet and the second side located adjacent the inner-surface of the second glass sheet. The insulated glass sealant is provided on, e.g., may be applied to, each side of the spacer frame to hold the glass sheets to the spacer frame. As discussed above, the sealant may function as a moisture barrier or moisture impervious material to prevent moisture from penetrating into the interior annular space of the unit. While this is a well known configuration for insulated glass units, other configurations known to an ordinary skilled artisan may be utilized and are incorporated by the present invention.

The two glass sheets and may be clear glass, e.g., clear float glass, or one or both of the glass sheets and could be colored glass. Additionally, a functional coating, such as a solar control or low emissivity coating, may be applied in any conventional manner, such as MSVD, CVD, pyrolysis, sol-gel, etc., to a surface, e.g., an inner surface, of at least one of the glass sheets. The spacer frame itself may be a conventional rigid or box-type, spacer frame as is known in the art. However, it is preferred that the spacer frame be a flexible-type spacer frame which may be formed from a piece of metal, such as 201 or 304 stainless steel, or tin plated steel and bent and shaped into a substantially U-shaped, continuous spacer frame. The spacer frame is adhesively bonded around the perimeter or edges of the spaced glass sheets and by the insulated glass sealant.

The insulated glass sealant may be applied to each side of the spacer frame to hold the glass sheets to the spacer frame. Additionally, or alternatively, the insulated glass sealant may be applied to each of the glass sheets. A number of methods may be employed to apply the sealant to the spacer frame and/or the glass sheets, as would be readily appreciated by one having ordinary skill in the art. For example, the sealant may be applied to the spacer frame as a continuous, non-continuous, uniform, or non-uniform bead. The sealant may similarly be applied to one or more of the glass sheets. The glass sheets may then be secured to the spacer frame by the sealant. As stated above, a number of other configurations and methods may be employed to seal the insulated glass unit with the insulated glass sealant.

As will be appreciated, the components of the insulated glass unit and spacer frame may be fabricated in any convenient manner, but are then modified as discussed herein to include the insulated glass sealant of the present invention.

For example, a substrate, such as a metal sheet of 201 or 304 stainless steel having a thickness, length, and width sufficient for producing a spacer frame of desired dimensions, may be formed by conventional rolling, bending, or shaping techniques. Although the sealant may be provided on the substrate before shaping, it is generally preferred that the sealant be applied after the spacer frame is shaped. The insulated glass unit is assembled by positioning and adhering the glass sheets to the spacer frame by the sealant in any convenient manner. An insulating gas, such as argon or krypton, may be introduced in any convenient manner into the annular space created between the first and second glass sheets. The sealant material beads may act to attach the glass sheets to the spacer frame. The sealants of the present invention maintain the excellent attributes of traditional polyurethane sealants, including low water swell, low moisture vapor transmission, good adhesion to the window frame, low migration of the insulating gas, and good workability, but without the use of isocyanates in the curing process. Because the present sealant employs compatible compositions which solidify at different rates and through different mechanisms, the present invention can be applied at a lower temperature than traditional hot melts, and also provides sufficient handling strength to the unit faster than traditional chemical-cure products, thereby combining the best properties of both the hot melt and chemically-curing technologies into a successful sealant for the insulated glass industry.

It will be readily appreciated by an ordinarily skilled artisan that modifications may be made to the invention without departing from the concepts disclosed in the foregoing description. For example, although the exemplary embodiment described above utilized two glass sheets attached to the spacer, the invention is not limited to insulated glass units having only two glass sheets but may be practiced to make insulated glass units have two or more glass sheets, as are known in the art. Further, in at least one embodiment of the invention, the sealant may be used with a spacer frame having a generally U-shaped cross-section. The invention, however, may be used with a spacer having any type of cross-section. Similarly, the invention is described above as forming a sealant bead on the spacer, on one or more glass sheets, or both. A number of other application methods may be utilized, however, in addition to utilizing a sealant bead, as would be appreciated by a skilled artisan. Still further, the layers of the sealant may be applied or flowed onto the outer surface of the spacer and/or the glass sheets in any convenient manner, e.g., one or more layers. Accordingly, the particular embodiments described in detail herein are illustrative only and are not limiting to the scope of the invention, which is to be given the full breadth of the appended claims and any and all equivalents thereof.

EXAMPLES

The present invention may be best understood in view of the following non-limiting examples.

Example 1

Three different reaction processes were tested to assess the reactivity of the carboxyl-terminated polymer and the polycarbodiimide:

A carboxyl-terminated polybutadiene polymer was reacted with a polycarbodiimide. In one embodiment of the present invention, a hydroxyl-terminated polybutadiene sold by Cray Valley USA, LLC under the trade name Poly bd® R45HTLO was reacted with a hexahydro-4-methyl phthalic anhydride (HHMPA) sold by Aldrich to form a carboxyl-terminated polybutadiene (Poly bd® R45CT). The polycarbodiimide employed was that sold by Piccassian Company under the trade name XL-725, which is a solution containing 76 wt % polycarbodiimide and 24 wt % tributoxyethyl phosphate (a plasticizer). The reaction weight ratio was as follows:

| Sealant Component | Weight Ratio |
|---|---|
| Poly bd ® R45CT (equivalent wt = 1374) | 100 |
| XL-725 (equivalent wt = 921) | 67.03 |

First, the carboxyl-terminated polybutadiene was heated to 149° F. (65° C.). The polycarbodiimide was then added to the warm carboxyl-terminated polybutadiene into a centrifuge cup and premixed by hand at room temperature. The mixture instantly gelled in about 2-3 seconds. This process approach was found to produce a crosslinking reaction which occurred too quickly to produce the preferred and desirable properties of the resultant elastomeric matrix.

Example 2

The same sealant components as in Example 1 were used in this Example 2, but with a different order of addition of the components. In this Example, a base hydroxyl-terminated polybutadiene (Poly bd® R45HTLO resin) was mixed well with the polycarbodiimide prior to adding hexahydro-4-methyl phthalic anhydride (HHMPA) into the mixture. Accordingly, in this embodiment of the present invention the carboxyl-terminated polybutadiene (Poly bd® R45CT) was prepared in situ and concurrently with the reaction with the polycarbodiimide. Instead of XL-725, a polycarbodiimide sold by Piccassian Company under the trade name XL-701 was used. The reaction weight ratio was as follows:

| Sealant Component | Weight Ratio |
|---|---|
| Poly bd ® R45HTLO (equivalent wt = 1220) | 100 |
| XL-701 (100% neat, equivalent wt = 590) | 48.36 |
| HHMPA (equivalent wt = 168.19) | 13.79 |

First, the propylene glycol monomethyl ether acetate solvent normally present in the XL-701 polycarbodiimide was stripped off by a rotary evaporator in order to get neat polycarbodiimide. The polycarbodiimide and the hydroxyl-terminated polybutadiene (Poly bd® R45HTLO resin) were mixed and dehydrated at 194° F. (90° C.) under vacuum for 1.5 hours. The mixture showed some visual haziness. The warm mixture (158° F., 70° C.) and HHMPA (73.4° F., 23° C.) were charged into a centrifuge cup and mixed 30 seconds in a speed mixer. Then they were poured into a metal mold for curing at 257° F. (125° C.) for 1 hour and, subsequently, at 194° F. (90° C.) over night. This sample was found to have cured well, with a processing window time of about 3 to 4 minutes.

Example 3

A third process method was tested with polycarbodiimide (XL-725) first mixed with HHMPA to see if gelling occurred. The hydroxyl-terminated polybutadiene (Poly bd® R45HTLO resin) was added subsequently. The reaction weight ratio was as follows:

| Sealant Component | Weight Ratio |
|---|---|
| Poly bd ® R45HTLO (equivalent wt = 1220) | 100 |
| XL-725 (equivalent wt = 921) | 75.49 |
| HHMPA (equivalent wt = 168.19) | 13.79 |

XL-725 and HHMPA were first charged into a centrifuge cup and mixed well in a speed mixer at room temperature. The mixture did not gel and showed a clear/yellow color. Warm 95 to 104° F. (35 to 40° C.) hydroxyl-terminated polybutadiene (Poly bd® R45HTLO) was added into the mixture and mixed for 1 minute in a speed mixer at 73.4° F. (23° C.). Accordingly, in this embodiment the carboxyl-terminated polybutadiene (Poly bd® R45CT) was prepared in situ and concurrently with the reaction with the polycarbodiimide. The mixture was then poured in to a metal mold for curing in an oven at 203° F. (95° C.) over night. The pot life of the reaction product was found to be about 20 minutes at 194° F. (90° C.).

The sample cured well after over night at 90° C. and also cured well at room temperature after over night. The HHMPA was found to be miscible with XL-725 according to the ratio in the formula, but these components did not form a gel after over night at 73.4° F. (23° C.).

Example 4

A further test was performed to check if HHMPA is miscible with pure polycarbodiimide. If they are miscible and do not form a gel, the mixture is thought likely to mix well with hydroxyl-terminated polybutadiene (Poly bd® R45HTLO) to make cured polymeric reactant products. A chain extender (2-ethyl-1,3-hexanediol (EHD)) was also utilized in this Example. Two samples were tested with the below reaction weight ratios:

| Sealant Component | Sample 1 (Weight Ratio) | Sample 2 (Weight Ratio) |
|---|---|---|
| Poly bd ® R45HTLO (equivalent wt = 1235) | 100 | 75.03 |
| XL-701 (100% neat, equivalent wt = 590) | 47.77 | 47.77 |
| HHMPA (equivalent wt = 168.13) | 13.61 | 13.61 |
| EHD (equivalent wt = 73.12) | 0 | 1.48 |

First, the solvent was stripped out from the polycarbodiimide (XL-701) which is generally a 50% polycarbodiimide solution in a propylene glycol monomethyl ether acetate (PMA) under vacuum by a rotary evaporator in order to get neat polycarbodiimide. The mixture of the polycarbodiimide and HHMPA was found to be miscible after the polycarbodiimide dissolved in the HHMPA. These components were found not to react with each other and no gel was found for this mixture during or after over night curing.

All of the components in each sample formula were charged into a plastic centrifuge cup and mixed by a speed mixer. The mixture was then cured in a mold at 194° F. (90° C.) in an oven. The pot life of each sample formula was found to be about 3-5 minutes and each sample formula had a tacky free time of less than 30 minutes. The samples were also found to cure well at both elevated temperature and at room temperature.

Example 5

A further test was performed to observe the effect of different types of raw materials on the curing reaction and the physical properties of the resulting elastomeric matrix products. As before, a number of hydroxyl-terminated polybutadienes were tested and reacted with an anhydride, and optionally, a chain extender, to produce carboxyl-terminated polybutadienes. A listing of the raw materials tested is shown below:

| Raw materials | Eq. weight |
|---|---|
| Poly bd ® R45 HTLO | 1235 |
| Krasol ® LBH 2000L | 1110 |
| Krasol ® LBH-P2000 | 1140 |
| EHD (sold by Kyowa Hakko) | 73.12 |
| XL-725 (76% solution in a plasticizer) | 921 |
| HHMPA | 168.19 |

Several sample formulas were tested using the raw materials listed above. The sample formulas and the weight ratios of the components in the formulas are shown below:

| Sample Formula | 1 | 2 | 3 | 4 | 5 | 6 | 7 |
|---|---|---|---|---|---|---|---|
| Poly bd ® R45HTLO | 100 | 100 | — | — | — | 50 | 50 |
| Krasol ® LBH 2000L | — | — | 100 | — | — | — | — |
| Krasol ® LBH-P2000 | — | — | — | 100 | 100 | 50 | 50 |
| EHD | — | 1.97 | — | — | 2.14 | — | 2.06 |
| XL-725 | 74.6 | 99.43 | 82.97 | 80.79 | 107.72 | 77.68 | 103.58 |
| HHMPA | 13.63 | 18.13 | 15.15 | 14.75 | 19.68 | 14.19 | 18.92 |

The one or more hydroxyl-terminated polybutadienes, the polycarbodiimide, and the EHD (if present in the sample formula) were first charged into a plastic centrifuge cup and mixed well in a speed mixer at room temperature. HHMPA was subsequently added into the cup and mixed in a speed mixer. Accordingly, in these embodiments the carboxyl-terminated polybutadienes were prepared either prior to, or in situ and concurrently with, the reaction with the polycarbodiimide. A mixture of each formula was then poured into molds for curing at 194° F. (90° C.) and 73.4° F. (23° C.), respectively. Each product was then cured at 194° F. (90° C.) and the hardness of each product was tested by Shore 00 meter. The results of these tests are shown below:

| | Results | | | | | | |
|---|---|---|---|---|---|---|---|
| | 1 | 2 | 3 | 4 | 5 | 6 | 7 |
| Cured @ 90° C. | good | good | slow rate** | good | good | Good | good |
| Hardness | 68 | 55-60 tough | 40-46 shrunk | 48-55 soft | 40-45 soft | 58-62 tough | 52 soft |
| Cured @ 23° C. | NA | OK | Not cured | OK+ | OK+ | Good | OK+ |

**showed very slow curing rate: less than 2 hours at 194° F. (90° C.); did not cure after over night curing at 73.4° F. (23° C.).

Example 6

A further test was performed to analyze the moisture barrier properties of the sealant. The hydroxyl-terminated polybutadiene (Poly bd® R45HTLO resin) was mixed with a solvent-free polycarbodiimide to form a solution. To the solution, HHMPA was added to produce a carboxyl-terminated polybutadiene. After mixing, the solution was poured on an open mold to cure. The harvested elastomeric matrix sheet was then tested for water-vapor transmission (WVT). The elastomeric matrix sheet had a film thickness of 0.284 cm and an area of 50 cm². The sheet was loaded on a MOCON PERMATRAN-W model 3/33 tester at 73.4° F. (23° C.). After 120 hours, the transmission rate reached equilibrium at 5.122661 gm/[m²-day].

As discussed above, the elastomeric matrix sheet could also be prepared by mixing polycarbodiimide and HMMPA initially. To the mixture, the hydroxyl-terminated polybutadiene may be added to form carboxyl-terminated polybutadiene. Alternatively, a carboxyl-terminated polymer may be used directly to react with the polycarbodiimide, as discussed above. The purpose of sequential addition is to extend the work life of the reaction mixture. Additionally, as discussed above, a chain extender may be employed to improve the mechanical properties of the cured sheet.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. An insulated glass sealant comprising an elastomeric matrix that is the reaction product of a carboxyl-terminated polymer and a polycarbodiimide, the elastomeric matrix having a Shore 00 hardness at 25° C. of at least 30, and
wherein the carboxyl-terminated polymer is the reaction product of a hydroxyl-terminated polymer, an anhydride, and a chain extender, the chain extender selected from the group consisting of N,N-diisopropanol aniline (DIPA) and 2-ethyl-1,3-hexanediol (EHD).

2. The insulated glass sealant of claim 1, further comprising one or more additives selected from the group consisting of inorganic fillers, plasticizers, and mixtures thereof.

3. The insulated glass sealant of claim 1, wherein the carboxyl-terminated polymer is hydrophobic.

4. The insulated glass sealant of claim 1, wherein the carboxyl-terminated polymer has a glass transition temperature (Tg) of less than about 32° F. (0° C.).

5. The insulated glass sealant of claim 1, wherein the carboxyl-terminated polymer contains a major component selected from the group consisting of carboxyl-terminated polybutadienes, carboxyl-terminated polyisoprenes, carboxyl-terminated copolymers of butadiene with acrylonitrile, carboxyl-terminated copolymers of isoprene with acrylonitrile, carboxyl-terminated copolymers of isoprene with styrene, carboxyl-terminated copolymers of butadiene and styrene, and mixtures thereof.

6. The insulated glass sealant of claim 1, wherein the elastomeric matrix has an equivalent ratio of polycarbodiimide to carboxyl-terminated polymer from about 0.25:1 to about 2:1.

7. The insulated glass sealant of claim 1, wherein the elastomeric matrix has an equivalent ratio of polycarbodiimide to carboxyl-terminated polymer from about 0.7:1 to about 1.4:1.

8. The insulated glass sealant of claim 1, wherein the carboxyl-terminated polymer has a number average molecular weight in the range of 500 to 30,000.

9. The insulated glass sealant of claim 1, wherein the carboxyl-terminated polymer has a number average molecular weight in the range of 1,000 to 20,000.

10. The insulated glass sealant of claim 1, wherein the elastomeric matrix has an equivalent ratio of polycarbodiimide to carboxyl-terminated polymer from about 0.7:1 to about 1.4:1 and the carboxyl-terminated polymer has a number average molecular weight in the range of 1,000 to 20,000.

11. The insulated glass sealant of claim 1, wherein the polycarbodiimide is selected from the group consisting of aromatic, cycloaliphatic, aliphatic, and heterocyclic carbodiimides, and mixtures of two or more thereof.

12. The insulated glass sealant of claim 1, wherein the polycarbodiimide has an average functionality equal to, or greater than, 2.

13. A method of making the insulated glass sealant of claim 1, wherein the elastomeric matrix is formed directly from the reaction of the carboxyl-terminated polymer and the polycarbodiimide.

14. A method of making the insulated glass sealant of claim 1, wherein the elastomeric matrix is formed by first reacting the hydroxyl-terminated polymer with the anhydride and the chain extender, to produce the carboxyl-terminated polymer; and then reacting the carboxyl-terminated polymer with the polycarbodiimide.

15. The method of claim 14, wherein the anhydride is 4-methylhexahydrophthalic anhydride (HHMPA).

16. A method of making the insulated glass sealant of claim 1, wherein the elastomeric matrix is formed by reacting the hydroxyl-terminated polymer with the anhydride and the chain extender, in situ with the polycarbodiimide.

17. The method of claim 16, wherein the anhydride is 4-methylhexahydrophthalic anhydride (HHMPA).

18. A method of sealing an insulated glass unit comprising:
applying an insulated glass sealant according to claim 1 to one or more glass sheets, a spacer to be disposed between the glass sheets, or both; and
contacting the one or more glass sheets with the spacer to define an annular space between the glass sheets and to produce the insulated glass unit.

19. The method of claim 18, wherein the sealant further comprises one or more additives selected from the group consisting of inorganic fillers, plasticizers, chain extenders, and mixtures thereof.

20. The method of claim 18, wherein the carboxyl-terminated polymer is hydrophobic and contains a major component selected from the group consisting of carboxyl-terminated polybutadienes, carboxyl-terminated polyisoprenes, carboxyl-terminated copolymers of butadiene with acrylonitrile, carboxyl-terminated copolymers of isoprene with acrylonitrile, carboxyl-terminated copolymers of isoprene with styrene, carboxyl-terminated copolymers of butadiene and styrene, and mixtures thereof.

21. The method of claim 18, wherein the sealant is applied as a bead to the one or more glass sheets, the spacer, or both.

22. The method of claim 18, further comprising prior to or concurrent with the contacting step, introducing an insulating gas into the annular space created between the first and second glass sheets, wherein the insulating gas is selected from argon or krypton.

23. An insulated glass unit comprising:
a first glass sheet having an inner surface and an outer surface;
a second glass sheet having an inner surface and an outer surface, wherein the first and second glass sheets are positioned such that said inner surfaces of the glass sheets are facing one another;
a spacer located between the first and second glass sheets, the spacer having a first side and a second side, with the first side of the spacer located adjacent the inner surface of the first glass sheet and the second side of the spacer located adjacent the inner surface of the second glass sheet;
and an insulated glass sealant according to claim 1 connecting the first and second glass sheets to the spacer.

24. The insulated glass unit of claim 23, wherein the sealant further comprises one or more additives selected from the group consisting of inorganic fillers, plasticizers, chain extenders, and mixtures thereof.

25. The insulated glass unit of claim 23, wherein the carboxyl-terminated polymer is hydrophobic and contains a major component selected from the group consisting of carboxyl-terminated polybutadienes, carboxyl-terminated polyisoprenes, carboxyl-terminated copolymers of butadiene with acrylonitrile, carboxyl-terminated copolymers of isoprene with acrylonitrile, carboxyl-terminated copolymers of isoprene with styrene, carboxyl-terminated copolymers of butadiene and styrene, and mixtures thereof.

26. The insulated glass unit of claim 23, wherein the elastomeric matrix has an equivalent ratio of polycarbodiimide to carboxyl-terminated polymer from about 0.7:1 to about 1.4:1.

27. The insulated glass unit of claim 23, wherein the carboxyl-terminated polymer has a number average molecular weight in the range of 1,000 to 20,000.

28. The insulated glass unit of claim 23, wherein the first and second glass sheets and the spacer are configured to provide an annular space between the glass sheets and wherein the insulated glass unit further comprises insulating gas within the annular space.

* * * * *